(No Model.)

J. EDWARDS.
WHEEL HUB.

No. 469,235. Patented Feb. 23, 1892.

Witnesses,
John L. Jackson
Nellie McKibben

Inventor
James Edwards
By Bond & Adams
Attys.

UNITED STATES PATENT OFFICE.

JAMES EDWARDS, OF PERU, ILLINOIS, ASSIGNOR TO THE PERU PLOW AND WHEEL COMPANY, OF SAME PLACE.

WHEEL-HUB.

SPECIFICATION forming part of Letters Patent No. 469,235, dated February 23, 1892.

Application filed October 1, 1891. Serial No. 407,462. (No model.)

*To all whom it may concern:*

Be it known that I, JAMES EDWARDS, a citizen of the United States, residing at Peru, in the county of La Salle and State of Illinois, have invented certain new and useful Improvements in Wheel-Hubs, of which the following is a specification, reference being had to the accompanying drawings, in which—

Figure 1:
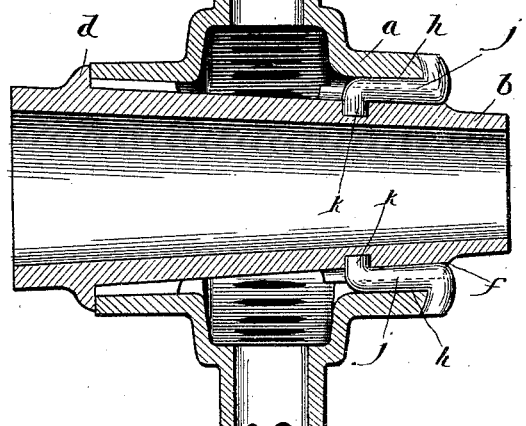
Figure 2:
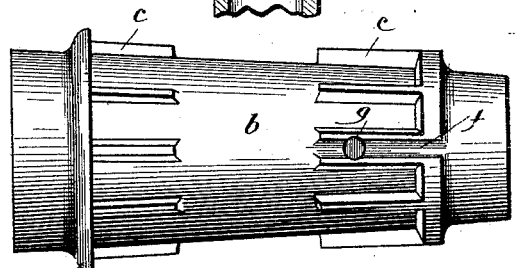
Figure 3:
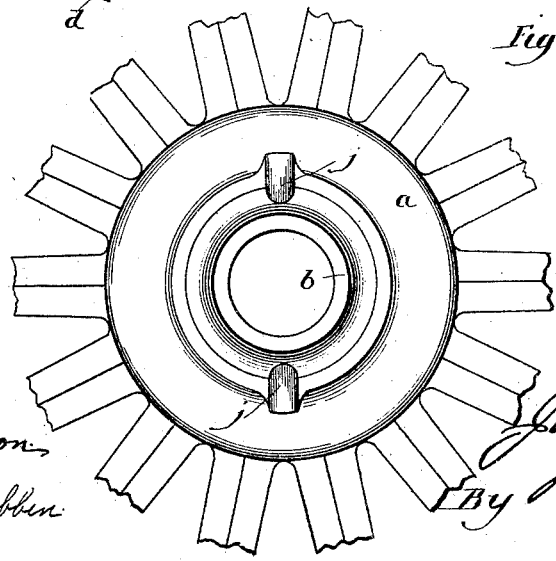

Figure 1 is a central vertical section. Fig. 2 is a plan view of the exterior of the journal-box, and Fig. 3 is an end view.

My invention relates to hubs for vehicles, and more particularly to devices for securing hubs upon journal-boxes.

The object of my invention is to provide a new and improved device for securing the hub upon the journal-box which will be simple in construction and inexpensive and which will effectually secure the parts together. I accomplish this object as hereinafter specified, and as illustrated in the drawings.

That which I regard as new will be pointed out in the claims.

In the drawings, $a$ indicates the hub of a wheel, which is adapted to receive a sleeve $b$, which forms a box to receive an axle-spindle. The exterior of that part of the box $b$ which fits into the hub $a$ is preferably provided with fins $c$, adapted to engage the inner surface of the hub in the usual manner. The inner end of the box $b$ is provided with a collar $d$, adapted to engage the inner edge of the hub to act as a stop for the hub.

The box $b$ is provided with one or more longitudinal channels or grooves $f$, which are so placed as to be covered by the hub when it is placed upon the box and terminate at a point under the outer edge of the hub, as best shown in Fig. 1. A recess $g$ is provided at a suitable point in each channel, preferably near its inner end.

The hub $a$ is provided with a channel $h$ on its inner surface, which is substantially similar to the channel $f$, except that it is not provided with the recess $g$. The channel $h$ is so placed that it will register with the channel $f$, and the number of channels in the hub is equal to the number in the box $b$.

$j$ indicates a key, which is adapted to lie in the space formed by the two channels $f$ and $h$. The inner end of the key is bent to form an extension $k$, adapted to enter the recess $g$, as best shown in Fig. 1, and the key is made of such shape as to fit snugly in its place. I prefer to make the channels $f$ and $h$ semicircular and to use a piece of wire for a key, as this construction is more simple and inexpensive. The length of the key $j$ is such that it extends a short distance beyond the outer edge of the hub.

To secure the hub in place upon the box $b$ the key $j$ is first placed in the channel $f$, its extension $k$ fitting the recess $g$. The hub is then placed upon the box in such position that the key $j$ will fit in the channel $h$. The outer end of the key is then swaged or bent upon the outer rim of the hub, as best shown in Fig. 1. The hub and box will thereby be firmly secured together and the withdrawal of the hub from the box is effectually prevented. The key also prevents turning of the hub on the box. This method of securing the hub upon the box is more particularly adapted for use with metallic wheels; but it may be applied to any other hubs having separate journal-boxes.

That which I claim as new, and desire to secure by Letters Patent, is—

1. The combination, with a hub having a channel $h$, of an axle-box having a channel $f$, adapted to register with the channel $h$, and a key adapted to be secured in said channels to firmly secure the hub and box together, substantially as described.

2. The combination, with a hub $a$, having a channel $h$, and a box $b$, adapted to fit into said hub and having a channel $f$ and recess $g$, of a key $j$, adapted to fit into said channels, said key having a projection $k$, adapted to enter the recess $g$, the outer end of said key being adapted to be swaged or bent upon the hub, substantially as described.

JAMES EDWARDS.

Witnesses:
RUDOLPH HEFTI,
WILLIAM K. HOAGLAND.